US004001644B2

United States Statutory Invention Registration [19]

[11] Reg. Number: H1644

[45] Published: May 6, 1997

Muehl, Sr.

[54] METHOD AND APPARATUS FOR PROVIDING CONTINUOUS CATHODIC PROTECTION BY SOLAR POWER

[75] Inventor: Wallace W. Muehl, Sr., Panama City Beach, Fla.

[73] Assignee: The United States of America as represented by the Secretary of the Navy, Washington, D.C.

[21] Appl. No.: 430,990

[22] Filed: Apr. 28, 1995

Related U.S. Application Data

[60] Division of Ser. No. 210,490, Mar. 21, 1994, abandoned, which is a continuation-in-part of Ser. No. 892,860, Jun. 3, 1992, abandoned, which is a continuation-in-part of Ser. No. 566,297, Aug. 13, 1990, abandoned.

[51] Int. Cl.[6] ..... C23F 13/00

[52] U.S. Cl. ..... 204/196; 204/197

[58] Field of Search ..... 204/147, 148, 204/196, 197; 136/293; 205/724, 735

[56] References Cited

U.S. PATENT DOCUMENTS

| | | | |
|---|---|---|---|
| 2,273,897 | 2/1942 | Scott | 204/147 |
| 2,743,227 | 4/1956 | Waite et al. | 204/197 |
| 3,071,531 | 1/1963 | Hosford | 204/196 |
| 3,242,064 | 3/1966 | Byrne | 204/196 |
| 3,349,017 | 10/1967 | Ziegler | 204/147 |
| 4,080,272 | 3/1978 | Ferry et al. | 204/147 |
| 4,136,309 | 1/1979 | Galberth | 204/196 |
| 4,959,603 | 9/1990 | Yamamoto et al. | 136/293 |
| 5,025,202 | 6/1991 | Ishii | 136/293 |
| 5,139,634 | 8/1992 | Carpenter et al. | 204/147 |
| 5,164,654 | 11/1992 | Bertram et al. | 136/293 |

*Primary Examiner*—Charles T. Jordan
*Assistant Examiner*—Meena Chelliah
*Attorney, Agent, or Firm*—William C. Townsend; Kenneth W. Dobyns; Edward J. Connors, Jr.

[57] ABSTRACT

A method and apparatus for cathodically protecting basic steel and iron structures located in an electrolyte without requiring any auxiliary backup power means on a continual basis. The method and impressed current type system use a PV solar panel array to supply dedicated DC operating current after the structure is first initially temporarily provided with preconditioning polarization on a one-time-only basis for a predetermined extended continuous time period, such as from about 3–7 days, by a separate non-solar DC generating means, thereby impressing it with the requisite beneficial relatively high negative potential which completes the initial polarization. The temporary power source is then permanently disconnected and the solar array is promptly connected in circuit to continue to provide the requisite high negative beneficial potentials which were achieved by the preconditioning polarization, and to thereby maintain the cathodic protection. The impressed relatively high negative potential has a slower rate of decay that permits the use of a PV solar array, and provides excess available power without the customary auxiliary backup power means, such as batteries. This unique method enables the system to easily maintain the impressed current cathodic protection system indefinitely even during inclement weather and nighttime conditions. In an alternate form of the invention, an ultracapacitor operating in circuit with a current limiter and at least one blocking diode may replace the temporary power source.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 4

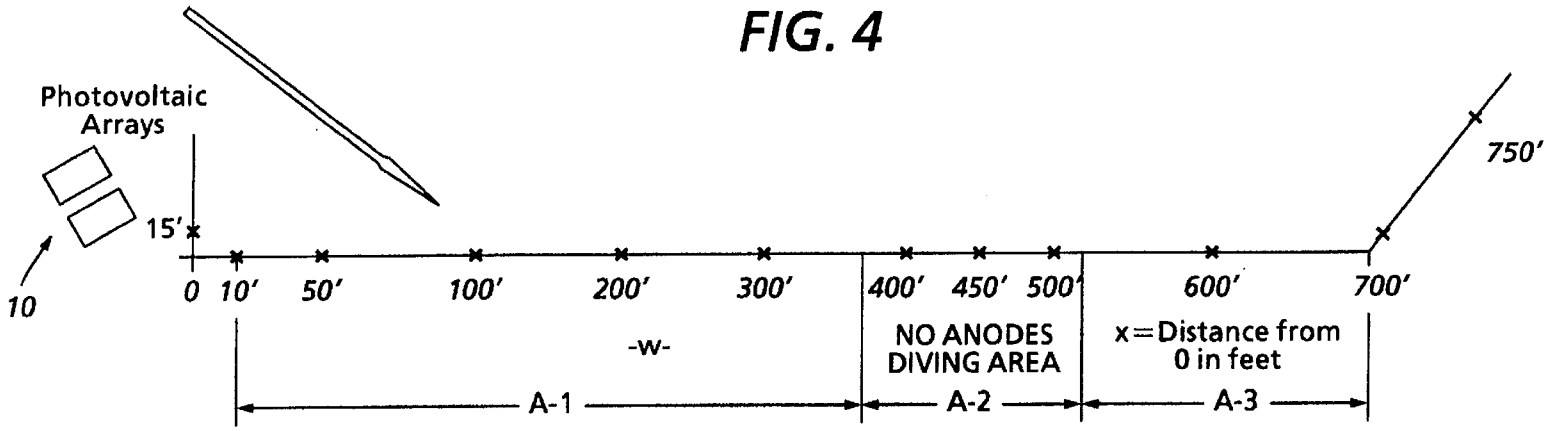

PRECONDITIONING POLARIZATION
1/12/90 ENERGIZE SYSTEM WITH INITIAL POLARIZATION SET AT ±74 – A FROM TEMPORARY DC POWER SOURCE
POTENTIALS MEASURED AND RECORDED 1/12/90

| POWER | 10' | 50' | 100' | 200' | 300' | 400' | 450' | 500' | 600' | 700' | AVERAGE |
|---|---|---|---|---|---|---|---|---|---|---|---|
| ON | -0.903V | -0.991V | -0.976V | -1.072V | -1.029V | -0.817V | -0.912V | -0.914V | -1.024V | -0.898V | -0.959V |

1/19/90 PRECONDITIONING POLARIZATION COMPLETED. SECURE POWER
POTENTIALS MEASURED AND RECORDED 1/19/90 WITH POWER OFF (INSTANT OFF)

| POWER | 10' | 50' | 100' | 200' | 300' | 400' | 450' | 500' | 600' | 700' | AVERAGE |
|---|---|---|---|---|---|---|---|---|---|---|---|
| OFF | -1.162V | -1.161V | -1.128V | -1.178V | -1.175V | -1.047V | -1.085V | -1.090V | -1.106V | -1.030V | -1.115V |

DECAY AND REBUILDING
1/19-20/90 DECAY AND REBUILDING -- PV ARRAY ENERGIZED (NO BATTERY BACKUP)
POTENTIAL AND AMPS MEASURED AND RECORDED WITH LOWEST POTENTIAL MEASURED AND RECORDED AT 0900
ON 1/20/90 -0.859v, SUNRISE 0639, SUNSET AT 1709 WITH CRESCENT MOON

SET VARIABLE RESISTOR AT ±46A, ADJUST AT NOON IN FULL SUNLIGHT ONLY

| TIME (CST) | 1400 | 1500 | 1600 | 1700 | 1800 | 1900 | 2000 | 2100 | 2200 | 2300 | 2400 | 0100 |
|---|---|---|---|---|---|---|---|---|---|---|---|---|
| POTENTIAL | -1.136V | -1.136V | -1.120V | -1.076V | -1.056V | -1.006V | -0.962V | -0.943V | -0.934V | -0.921V | -0.911V | -0.899V |
| AMPS | 47.1A | 45.4A | 43.0A | 20.5A | 18.3A | 2.7A | 1.8A | 1.8A | 1.7A | 1.3A | 0.9A | 1.5A |

| TIME | 0200 | 0300 | 0400 | 0500 | 0600 | 0700 | 0800 | 0900 | 1000 | 1100 | E 1200 | E 1300 |
|---|---|---|---|---|---|---|---|---|---|---|---|---|
| POTENTIAL | -0.893V | -0.889V | -0.886V | -0.879V | -0.872V | -0.868V | -0.863V | -0.859V | -0.890V | -0.970V | -1.060V | -1.120V |
| AMPS | 2.5A | 3.5A | 4.2A | 4.3A | 5.4A | 6.5A | 7.3A | 8.3A | 10.5A | 27.2A | 37.5A | 45.4A |

METHOD AND APPARATUS FOR PROVIDING CONTINUOUS CATHODIC PROTECTION BY SOLAR POWER

GOVERNMENT INTEREST STATEMENT

The invention described herein may be manufactured and used by or for the Government of the United States of America for government purposes without the payment of any royalties thereon, and is being assigned to the U.S. Government.

This application is a division of application Ser. No. 08/210,490, filed Mar. 21, 1994, abandoned, which is a continuation in part of U.S. application Ser. No. 07/892,860 filed Jun. 3, 1992, which is a continuation in part of U.S. application Ser. No. 07/566,297 filed Aug. 13, 1990, abandoned.

BACKGROUND OF THE INVENTION

The present invention relates generally to cathodic protection, and more specifically to an impressed current cathodic protection system of the type employing a photovoltaic (PV) solar powered system to protect metallic structures, such as piers made of steel or other iron bearing material, installed in electrolytic media such as sea water or soil, from electrochemical corrosion and deterioration. This system uses an external dedicated direct current (DC) as the power source to develop and maintain a negative potential between one or more of a series of electrodes external to the structure be the protected, and the structure to be protected. The electrodes and the structure to be protected preferably should be within the same area of the galvanic series prior to the application of power because this facilitates polarization and minimizes anode corrosion. By applying the DC current to the electrodes, they become positive anodes from which the applied current flows. This impressed current flows out of the anodes, is conducted through the electrolytic medium, and is received by the surface of the structure to be protected, which structure becomes transformed into the negative electrode or cathode. Thus, polarization of the structure to be protected is considered to have occurred. Because it is well known in this technology that electrochemical corrosion occurs where the current leaves the anode metal surface to enter the ambient electrolyte, the anodes begin to corrode and those nearby surfaces that receive the current will not corrode, provided that a sufficient electrical potential is maintained between anode and cathode. Steel and cast iron structures are considered to become fully cathodically protected when the polarized potential of the structure is about −0.850 volt or more negative, with respect to a copper-copper sulfate reference electrode. Silver-silver chloride electrodes are more frequently used where they are required to be submerged in seawater because unlike the copper-copper sulfate electrode, they are not subject to contamination by seawater.

Anodes commonly used in impressed current systems are high-silicon cast iron with chromium added for improved resistance to the chloride attack of seawater.

In cathodic protection (CP) systems and technology, because it has been determined that by impressing a steel structure with the aforesaid −0.850 v negative potential or slightly more, the structure was considered to be cathodically well protected, then it became the logical and customary practice to maintain the potential at or about −0.850 v to −0.950 v to conserve energy, reduce energy costs and other operating costs such as minimizing the deterioration of the anodes. To obtain valid interpretation, the potential measurements must be corrected for IR drop through the electrolyte and metallic paths, by measuring the polarized potentials, usually −0.100 v to −0.300 v or more negative depending on the electrolyte, type and condition of the structure, temperature and other variables. Because of the usual use of readily available AC-DC rectifier systems to generate and maintain these adequate potentials on a continuous basis, and because of the reported potential for adverse effects, to be described, believed to be caused by the application of greater power to generate negative potentials above the approximate −0.950 v level, there was no impelling reason to explore or experiment with methods or apparatus to use higher negative potentials. This practice was further reinforced due to the possible disadvantages discovered by the limited trials of the higher negative potentials, particularly in laboratory tests, which were (1) causing of possible disbondment of various protective coatings preapplied to the structures and (2) the tendency due to absorption of atomic hydrogen to cause embrittlement, more particularly to high strength steel, or blistering and thereby prematurely weaken the structure's integrity. This phenomenon is seldom observed in the field because high strength steel is not generally used for steel structures in electrolytes such as sea water and pipe lines in soil. This prior art practice continued because it is considered axiomatic in CP systems that under the so-called instant-off conditions, the negative (cathodic) polarization potential will decay or drop within one second according to NACE, by about −0.100 v, to 0.300 v, or more, followed by further decay upon extending the off condition time, thus strengthening the belief that it was not possible to maintain the requisite beneficial negative potential and thus not possible to achieve adequate cathodic protection by any PV solar-powered CP system without an auxiliary backup power means (usually a battery).

While the prior art has many solar power applications, including cathodic protection, none of the systems or related methods are without battery backup systems that provide continuous DC power and have not suggested methods or ways of preconditioning or polarizing the structure or equipment to be protected by the temporary initial one time only use of a DC power generating source to impress the structure with significantly greater negative potentials over a selected extended time period. By my new procedure, the higher level negative polarized potentials developed are longer lived, or decay more slowly during periods of inclement weather and nighttime conditions, until their rebuilding upon receiving the benefit of the renewable solar panel generated DC current. This has been done successfully without any battery backup system for over two years.

As stated above, impressed current cathodic systems have required the use of rectifiers and other related complex circuitry and components to help assure a continuous DC power supply. Alternatively, electric motor or wind or any engine driven DC generator sets, DC welders, batteries, thermoelectric cells, and solar cells accompanied by backup battery systems, have been used to try to provide the requisite continuous DC current. These are not cost effective and many would adversely impact the environment, particularly when attempting such installations in remote areas or where continuous electrical power is not readily available.

OBJECTS AND BRIEF SUMMARY OF THE INVENTION

It is the primary object of this invention to provide a method and apparatus for achieving continuous cathodic protection of a metallic structure using cost effective PV solar power means providing more than ample current without need of any auxiliary battery backup system.

It is further object to use an initial one-time only preconditioning polarization of the structure to be protected for a predetermined continuous time period to the extent that the impressed negative potential will have a sufficiently extended slow rate of decay to enable a suitable photovoltaic DC solar power source to easily maintain the impressed current cathodic protected condition of the structure indefinitely without the use of an auxiliary DC power backup such as a battery even during extended inclement or overcast weather or night time conditions.

Still another object is to provide such a method and system which reflect great simplicity by the elimination of any rectifier components or other DC generation equipment and the related circuitry, a system which is very cost effective to install and operate, essentially has no continuously moving parts, and is very suitable for remote installations while being environmentally harmless.

These and other objects and advantages, such as requiring fewer anodes for a given amount of protection, have become achievable by challenging the prior negative potential limitations established in the practice of this technology, which limitations, if exceeded, were heretofore believed to generate highly deleterious disbondment effects and embrittlement and other degradation of the structures sought to be protected. With a dedicated power source there was no impelling reason to provide a negative potential more negative than required to attain cathodic protection. My method uniquely recognizes certain apparent misconceptions of the prior art technology and includes an extended, sustained preconditioning period of polarizing the structure to be protected in order to successfully extend the time of decay of the beneficial potential. This is done by the impressing of higher levels of the requisite polarized negative potentials needed to sustain the beneficial cathodic protective process which precludes the onset of corrosion. This is achieved by the temporary initial one time only use of any suitable DC power generating means, which after the aforesaid protracted preconditioning period, is permanently disconnected and the selected PV solar power generating means is connected in circuit in lieu thereof.

The inventive method and related system will become more apparent from the following detailed description taken in conjunction with the accompanying illustrative drawing figures.

BRIEF DESCRIPTION OF DRAWINGS

FIG. 4 is a further more diagrammatic plan view of the system, similar to that shown in FIG. 1, plus an accompanying data table representative of the initial one-time-only polarization data and subsequent potential readings at denoted distance and time intervals for the elongated massive marine bulkhead dock facility.

DETAILED DESCRIPTION OF PREFERRED EMBODIMENTS

Figure 1:
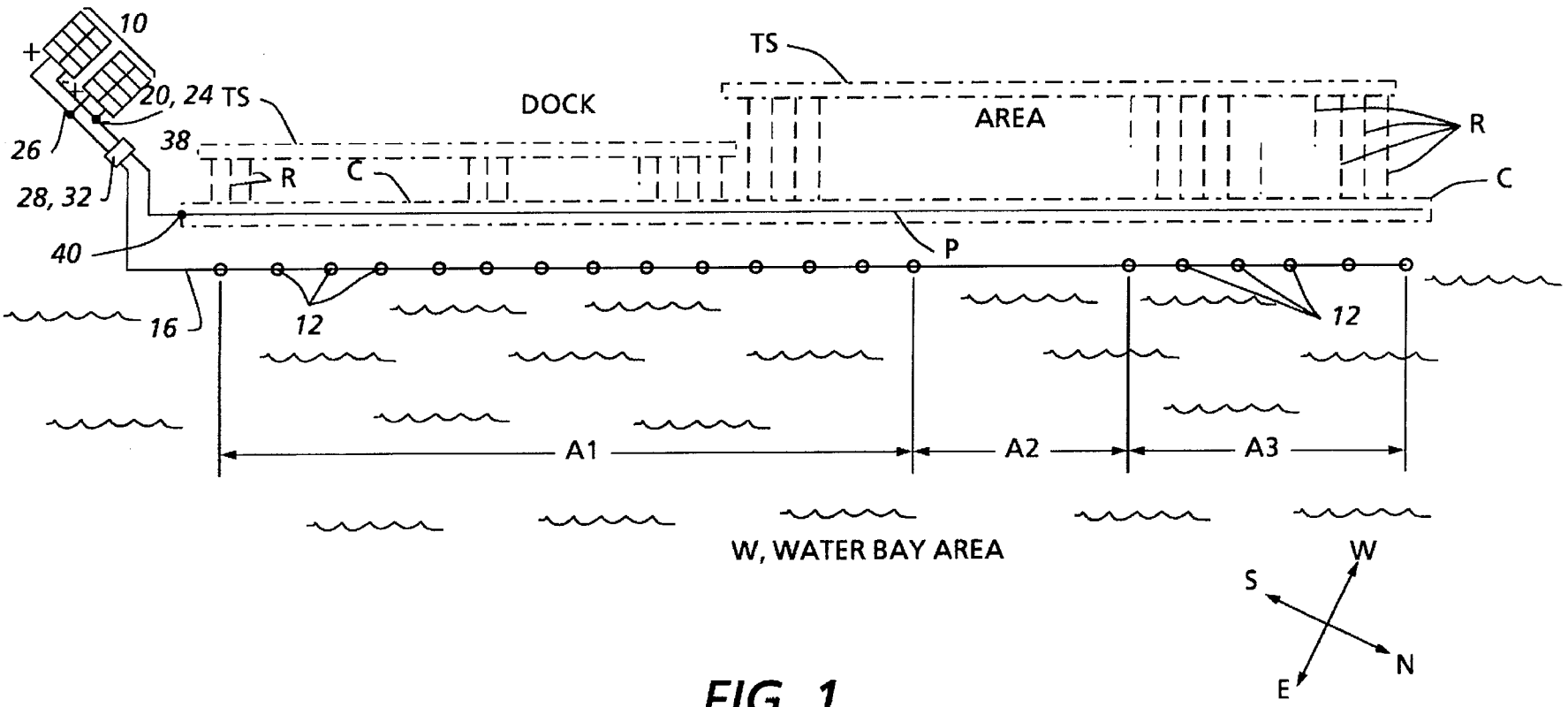
FIG. 1 is a diagrammatic top plan view representative of an elongated marine dock facility having a bulkhead to be protected, shown with my associated solar powered cathodic protection system.
Figure 3:
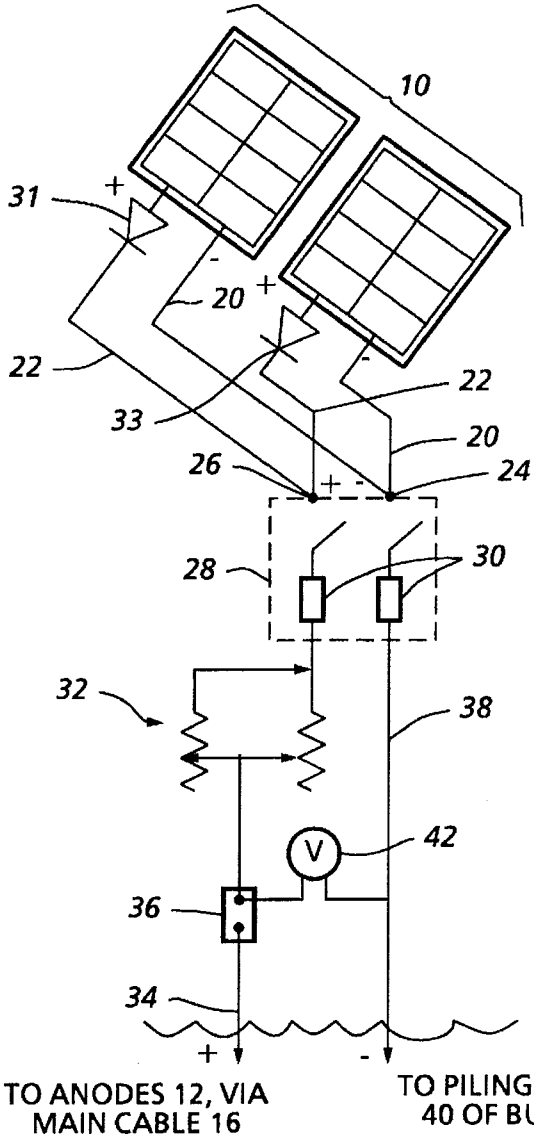
FIG. 3 is an electrical schematic of my impressed current system.
Figure 2:
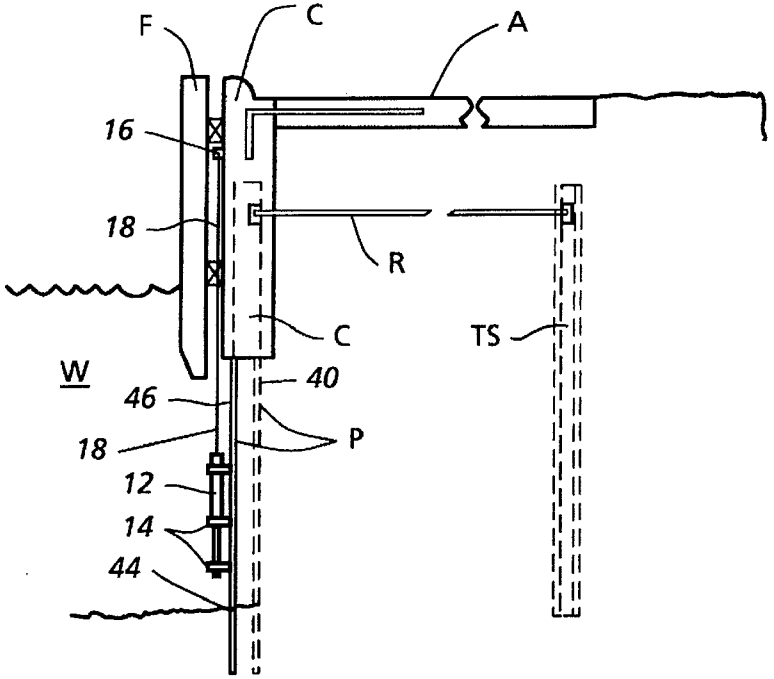
FIG. 2 is a vertical semi-diagrammatic, cross-sectional view through the bulkhead of FIG. 1, showing a standoff mounted anode, main anode feeder cable, with connecting branch cable to the anode, and the associated auxiliary bulkhead anchorage embedded in the embankment soil generally parallel to the main steel sheet piling.

Referring more specifically to FIGS. 1–3, starting with FIG. 1, an elongated dock area to be protected is denoted by the legend "dock area" and comprises a plurality of vertically driven interlocked steel sheet pilings denoted by the heavy line P in FIG. 1. This piling assembly, which extends along the waterfront of water area W for a distance of several hundred feet, is provided with an enveloping reinforced concrete cap portion C, shown in broken lines in FIG. 1, and better seen in solid line in FIG. 2. The concrete cap C extends a suitable distance below the waterline and together with the adjacent surface apron A and piling constitutes a continuous reinforced bulkhead to help form the dock area. The bulkhead preferably embodies a suitable stabilizing tie back structure TS buried in generally parallel relation therebehind, and also is comprised of similar steel piling which is interconnected to the forward piling P by a plurality of steel connecting rods R. A paved reinforced concrete slab which constitutes the basic apron A, and timbered fender area F, FIG. 2, complement the cap C to complete the dock area structure.

At least one solar panel array 10, which constitutes the only power source used in this system, after the initial one time only preconditioning polarization to be described later, is located at one end of the dock area to provide the requisite direct current power. A plurality of elongated anodes 12 are suitably rigidly supported in vertical disposition underwater by plural non-conductive brackets 14, FIG. 2, attached to the face of the sheet steel piling P below the lower edge of the concrete cap C. It is to be understood that the anodes can be mounted other than vertically and may be also mounted below the mudline. The sheet steel piling P has electrical continuity throughout its length via piling to piling electrical continuity, and will constitute the cathode of this system. The anodes 12, which are disposed at predetermined intervals, such as approximately twenty eight to thirty feet and a little forwardly of the bulkhead, are connected in parallel by an insulated CP (cathodic protection) main anode feeder conductor cable 16, FIGS. 1 and 2. Cable 16 is connected with the positive terminal side of the solar panels 10, via other interposed circuitry components to be hereinafter described.

Cable 16 constitutes the positive conductor leading from the solar array 10 from which a plurality of suitably joined individual branch feeder cables 18, FIG. 2, are individually operatively connected to the respective anodes 12. The negative conductors 20 leading from the solar array 10 are joined and operatively connected with other circuit components to be described, and then connected via further insulated conductor 38 to the nearby end of the sheet steel piling P, at the terminal 40. As stated before, the piling P must have electrical continuity. No other intermediate connections are needed or desired assuming the aforesaid piling to piling electrical continuity has been established.

This large dock installation is comprised of several lengthy areas designated A1, A2, and A3. It extends over several hundred feet, and includes a section A1 having a proximal end closer to the solar panels, a section A3 terminating at a distal end of the section A3, and an extended intermediate anode-free section A2 all of which is serviced by single solar powerered cathodic protection system. For example, area A1 is provided with fourteen anodes 12 spaced at approximately twenty eight foot intervals, starting at about ten feet in from the southeast end of the piling P. In the next adjacent area A2, which is approximately 155 feet long, no anodes are installed or desired due to the character of use, for example, daily Navy diving and training activities. This long anode-free area therefore is by-passed by routing the insulated main anode feeder cable 16 underwater, and is attached by spaced insulated mounting clips or brackets, not shown, to the forward wall of concrete cap C. The next area A3 has six anodes 12 mounted like those of area A1 but at about thirty foot intervals. Some other unique features and benefits of my present system include using significantly fewer anodes to protect a given area, and using much smaller size anodes compared to those anodes used in prior art conventional installations for any given comparable protected area. I heretofore have not known of any such large areas which were attempted to be protected by a single conventional CP system of this type, particularly any with an anode-free breach, or any that have not always required and relied upon an associated continuous power source such as a battery operated backup subsystem.

Prior art anodes commonly used for some of the known conventional similar systems weigh about 220 pounds each, are about 4½ in diameter and are about five feet long, whereas in my improved system, the anodes 12, made of the same material, are only three inches in diameter and weigh only 110 pounds for the same five foot length.

With reference now to the schematic of FIG. 3, the typical solar array 10 with blocking diodes 31, 33 on the current output side is preferably comprised of photovoltaic cell panels preferably connected in parallel. The panels are selected to provide a predetermined rated capacity of DC current, dictated by the particular needs of the system. Their negative conductors 20 and positive conductors 22, respectively are connected to terminals 24 and 26 to which a fused disconnect device 28, embodying fuses 30, is operatively connected. The positive side of the circuit also includes a suitable variable resistor means such as the illustrated dual variable resistor device 32. This device 32 is operatively connected so as to regulate the generated DC current flow passing through conductor 34 and a typical ammeter shunt device 36 enroute to the anodes 12 via the main feeder cable 16. Other forms of voltage regulating means may be used such as a DC-DC converter or a DC-AC inverter from which to power other AC equipment from the excess power capacity. Solar power from the arrays 10, without battery backup means, is regulated preferably by the variable resistor means 32 down to approximately 50 percent of the total rated capacity of the solar arrays. For example, the peak output of the solar array 10 has a capacity of 92.8 amps. It was regulated down to a maximum of about 46 amps via a suitable variable resistor means, when it was determined that less power was needed. This results in providing sufficient capacity to easily maintain the impressed current cathodic protection system indefinitely even in all inclement weather without any battery backup means. Table 1 data table illustrates this. The excess current which is available extends the amount of operational time at full regulated output which is evident from the data in FIG. 4 and Table 1. The ammeter device 36 is used to facilitate measurement of the solar panels' DC output. A voltmeter 42 may be connected across the conductors 34 and 38, as shown, to measure the voltage from the solar panel array 10.

The photovoltaic panel arrays 10 were designed to provide regulated DC current at the potential limits in the range of from about −1.050 v to about −1.600 v, so as to properly compensate for inclement weather conditions while still providing the desired acceptable potential negative voltage readings without requiring a battery backup system. For installations embodying uncoated bare steel structures, the potential limits would range from about −1,400 v to about −1,600 v, or more, because there is no concern that the hydrogen gas may evolve to a more vigorous bubble form which could cause disbondment, on some coated structures and perhaps embrittlement in high strength steel structures. Using data provided by the National Weather Service and Sandia National Laboratories, it was determined that for the geographical area in Panama City, Florida, at latitude of 30°10'N and 85°22'W, the solar array 10 could perform well and be mounted on a fixed axis. The latitude tilt angle of the array was set at 0° instead of a +15° (winter setting) in the month of January, and has remained there with continuing very satisfactory results. This signifies that other areas with good sunlight distribution, but lower solar insolation availability (Kwh/m2) levels could also install and benefit from my improved system and method.

It is understood that other options exist to further improve this excellent performance, such as installing the solar panels on either one or two axis tracking devices, or simply adding more panels to meet the particular requirements of the installation being protected. Any excess generated power can be utilized for other functions, such to run DC current motor driven pumps to fill or disperse from liquid tanks.

A principal unique aspect of the invention is the particular preconditioning polarization of the structure to be protected. In this regard, the seawall or bulkhead pilings P with the standoff mounted sacrificial anodes were initially impressed with a DC current from a temporary continuous DC power source prior to connecting the solar array 10 into the system. This was done continuously over an extended time period to expedite the desired sustainable polarizing. The predeterminable time period can range from about 3 to about 7 days dependant upon obtaining the adequate negative polarized potential of the structure. The temporary power source can be a conventional shore power with rectifiers, or any suitable portable DC generator or DC welder. Beginning on Jan. 12, 1990, the temporary source of DC current was applied substantially continuously for one week and initially at an amperage that peaked early at about 74 amps, to obtain a negative potential of from about −1,200 v to about −1,600 v. During initial monitoring, it was determined that the amperage was becoming in excess of that required to maintain the desired negative potentials. It was reduced to about 48 amps where it remained throughout the preconditioning polarization period. During this time, the individual anode current output was measured and found to maintain a good uniform beneficial average amperage per anode in the areas A1 and A3 adjacent each side of the anode-free area A2. Excellent initial preconditioning polarization potentials were measured and recorded with power on that averaged −0.959 v on the first day, including area A2 even though it was without any anodes. On the fifth day, Jan. 16, 1990 during the initial preconditioning polarization period, power was disconnected only temporarily, thereby interrupting the polarization for an hour to permit Navy diver technicians to inspect the steel piling. It was determined to be in good condition, showing no potential adverse effects such as any signs of disbondment of the tar coating. Beyond what was originally observed during a underwater inspection prior to and during the prepolarization of this PVCP system After the sustained week long initial preconditioning polarization procedure, the temporary power source was disconnected on Jan. 19, 1990. The negative polarized instant off potentials of the sheet steel piling were measured and recorded. These values are shown in FIG. 4 under the last portion of the heading "PRECONDITIONING POLARIZATION" and have the term instant off so designated therein. Again, very good results were observed with an average negative polarized potential of −1.115 v, which included the lengthy 155' interim anode-free area A2, FIGS. 1 and 4. All of the readings are indicated in FIG. 4.

Initial one time only preconditioning polarization has resulted in the evolution of a beneficial protective hydrogen film on the steel sheet piling above and below mudline with no deleterious effect concerning coating disbondment. Qualified divers have inspected this installation several times since the startup and report it to be be in good condition with no sign of active corrosion occurring.

Following the permanent disconnecting of the temporary DC power source from the system, the solar array 10 was operatively connected into the circuit of this system in lieu of the temporary one time only power source. During the next twenty-four hours with this solar power on-line and without any auxiliary batteries or other continuous power source, the decay and rebuilding values of the negative potentials of the steel sheet piling P were measured and recorded. These can be read under the subheading or subtitle of "Decay And Rebuilding" in FIG. 4.

or least negative potential observed and recorded was −0.859 v at 0900 on Jan. 20, 1990. This is still above the threshold value to maintain beneficial polarization. Many other measurements were taken over and over again, including at the mudline point 44 of the pilings P, FIG. 2, at the middle areas, and then on upper top portions of the submerged steel pilings P, but below the concrete cap C, as at point 46, FIG. 2. There were only minimal differences in these respectively measured negative potentials. The data in the chart table of FIG. 4 are representative of these readings, including the poorest one obtained, as stated above.

This developmental installation was completed in January 1990, which is normally considered to be one of the least desirable months of the year for use of solar power because of the lower solar insolation availability. With the solar panel array set at latitude 0° instead of latitude +15° for winter months, very favorable readings were obtained throughout daily and monthly periodic readings. The accompanying Table 1 is a compilation of monitored readings over a seven-month period, mostly taken during the approximate mid-morning hours because this proved to be the time period for the greatest decay of the potentials.

TABLE 1

MONITORING OF PV POWERED CATHODIC PROTECTION SYSTEM - ENERGIZED

Potentials measured and verified - (during poorest decays recorded 1/19–20/90). The comparative decay potentials indicated take into consideration sunrise, sunset, declination of sun and fixed PV arrays, sat at latitude.

| Date | Time | Potential | Recorded Equivalent Potential 1/20/90 (100% Sunshine) Decay and Rebuilding | % Sun-Shine | Comments |
|---|---|---|---|---|---|
| 2/12/90 | CST 1015 | −1.107V | −.925V | 100 | Clear |
| 2/23/90 | CST 1045 | −1.086V | −.970V | 33 | Cloudy, intermittent rain |
| 3/6/90 | CST 0805 | −1.049V | −.863V | 90 | Mostly clear |
| 3/29/90 | CST 0815 | −1.050V | −.866V | 22 | Dark clouds, intermittent heavy rain |
| 4/4/90 | CDST 0815 | −1.090V | −.866V | 100 | Clear |
| 4/26/90 | CDST 0815 | −1.098V | −.866V | 35 | Cloudy, intermittent rain |
| 5/8/90 | CDST 0930 | −1.058V | −.863V | 7 | Dark overcast, rainy |
| 5/9/90 | CDST 0950 | −1.037V | −.927V | 0 | Dark overcast, steady rain |
| 6/7/90 | CDST 0840 | −1.126V | −.882V | 67 | Clouds |
| 6/13/90 | CDST 0745 | −1.071V | −.871V | 99 | Mostly clear |
| 6/15/90 | CDST 0830 | −1.105V | −.879V | 83 | Haze,montly clear |
| 6/20/90 | CDST 1000 | −1.198V | −.937V | 97 | Mostly clear |
| 6/29/90 | CDST 0830 | −1.143V | −.879V | 51 | Cloudy, intermittent rain |
| 7/10/90 | CDST 0900 | −1.192V | −.898V | 60 | Cloudy, intermittent light rain |
| 7/26/90 | CDST 0740 | −1.070V | −.861V | 72 | Clouds |
| 8/2/90 | CDST 0915 | −1.147V | −.937V | 39 | Dark clouds, intermittent heavy rain |
| 8/8/90 | CDST 1050 | −1.198V | −1.015V | 48 | Hazy, light overcast |

Note steady improvement in potentials - even during inclement weather.

During the period covering from 1400 hours to 1300 hours, as set forth in FIG. 4, it can be seen that the poorest The Table 1 readings of the comparative decay potentials take into consideration sunrise, sunset, declination of the sun, stationary PV arrays and being set at the latitude. The percent values in the Percent Sunshine column were obtained from the National Weather Service. Following the poorest decays recorded on the first morning (Jan. 20, 1990) after the connection of the system to the solar panel 10, it can be seen from the verified readings in Table 1 that the negative potentials significantly increased from those of Jan. 20, 1990, during the subsequent seven months of February through Aug. 8, 1990 and thereafter. The negative potentials were found to have also significantly improved during the less critical decay times of the day.

The successful polarization of the complete dock area has been and continues to be achieved per the foregoing method and PV solar powered CP system, even in the large 155' long intermediate anode-free area A2. By attaching the negative conductor from the solar panel at the very end of the cathodic piling P at 40, without any intermediate conductor leads, the undissipated cathodic current from the anodes of area A3 has to flow into and along the piling, area A2. Alternatively stated, because the anodes in area A1 and A3 provide the strong steady current to the cathodic steel piling P, this huge cathode provides only one path for any of the undissipated negative current to follow. This path of necessity includes that large anode-free area A2. Even attributing a small carryover by the two respectively closest adjacent anodes of areas A1 and A3 of perhaps twenty feet each, the remaining 115' has been and continues to be sufficiently polarized, even though one might have suspected it might become an unprotected area.

By the aforesaid arrangement, better seen in FIG. 1, with the positive and negative conductors of the DC current from the solar panel means representing the input and output to the structure, and respectively being disposed at the structure's end portion near which the solar panel is disposed, a pathway is provided for the negative current across the anode free area of the piling P.

Before installing a CP system, it is preferable that other data is obtained such as testing the sheet steel pilings for electrical continuity, the PH and salinity of the electrolyte, for native structure to electrolyte potentials, interference testing, and other environmental conditions such as soil resistivity and the pH of the soil and ground water. These data must be considered to help determine the design including the power requirements of the system. Also, it is important to install one or more suitable conventional test stations in conjunction with such a long installation, to facilitate the initial frequent monitoring of potentials.

The foregoing explanation and data represent strong evidence of the ability of this improved system to generate and maintain the high level of polarization and a beneficial protective hydrogen-ion film on the steel piling both below and above the mudline 44. It is to be noted that the evolution of a protective hydrogen film is merely a beneficial by-product of the preconditioning polarization at the higher negative potentials. While the hydrogen film is helpful in extending the decay time of the potentials, it is not absolutely required in systems such as mine for steel structures which were provided with a good protective coating prior to or during their initial installation. On bare uncoated structures, the preconditioning polarization levels are controlled to provide an appropriate beneficial hydrogen film depth. The evolution and quality of hydrogen formation is considered to be a function of the amount of DC current uniformly and continuously applied to the structure.

This large steel based dock structure has maintained its exceptionally good polarization throughout its several hundred foot long length, even though it embodies an extensive 155' long anode-free area, A2, intermediate its proximal and distal end portions A1 and A3. The monitored readings and test data show that the anode amperage output on both sides of this anode-free section A2 maintained good uniformity per anode.

Responsive to the initial several day period of preconditioning polarization by the temporary energy supply means, followed by the substituted on-line PV solar array, this unique arrangement and method proved that a single solar system without battery backup means successfully operates to provide a much more efficient and lower cost CP system. An analogy may be that the steel structure becomes very effectively polarized, and will remain so by the variable charge effect provided by the simple solar array system, much like a piece of steel or iron can become magnetized by the application of a DC electrical current.

A further explanation of this system is that the anode-seawater-cathode piling structure acts like a battery and is electrochemical in nature. Open circuit voltage readings taken in the dark when the PV cells were not supplying current to the structure were nearly negative 1.950 v. Short circuit current was measured in excess of 4 DC amps. When the circuit was allowed to "rest" for a period and readings were again taken the polarity level had recovered indicating an electrical energy storage mechanism. It is believed that the one-time only initial preconditioning polarization of the structure embeds atomic hydrogen which can also migrate and diffuse in the structure (and not molecular hydrogen which will not migrate and could cause embrittlement or blistering particularly in high strength steel). This permits the PV cells to provide an efficient charge, delaying the decay of the negative potential allowing the system to provide complete continuous cathodic corrosion protection even in cloudy dark conditions without the necessity for DC power backup such as batteries.

In summary, the foregoing novel method and system of initially preconditioning or prepolarizing the structure prior to energizing the PV solar array on-line with the system, provides a relatively higher negative potential that has a slow rate of decay. This permits the use of regulated PV solar energy with excess available power, and without any backup power, to easily maintain the impressed current CP system indefinitely even during inclement weather and nighttime conditions.

Figure 5:
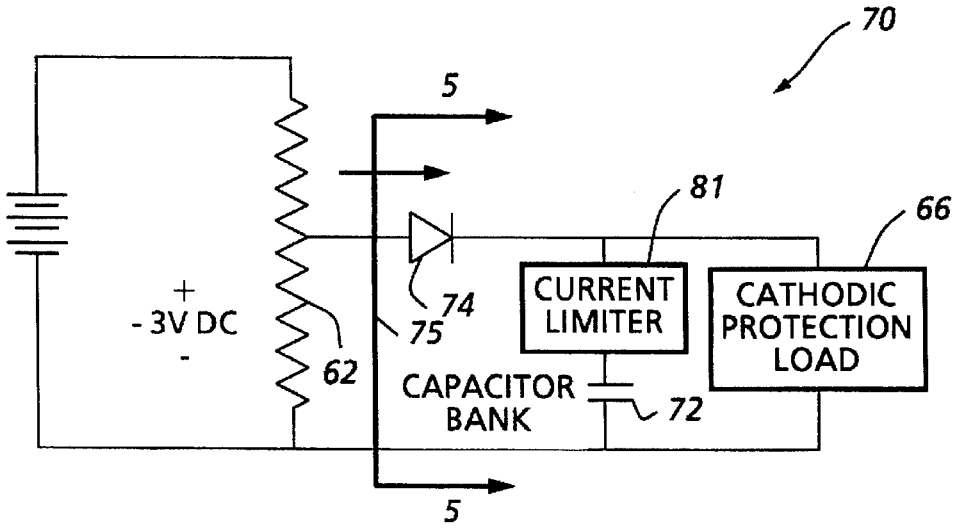
FIG. 5 is a circuit diagram of an alternate form of the invention employing an ultracapacitor.
Figure 6:
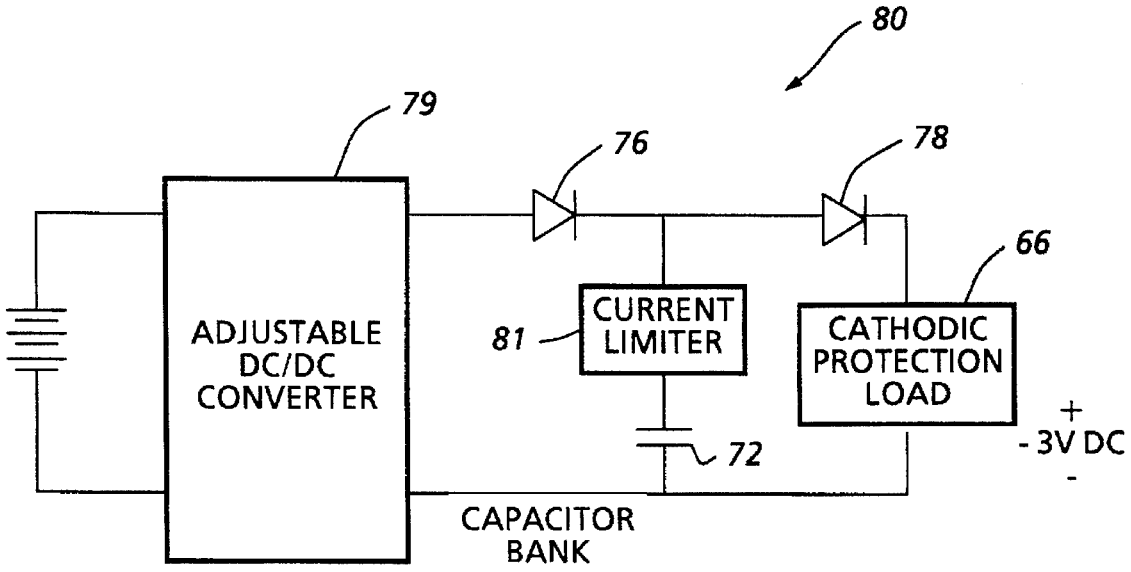
FIG. 6 is a circuit diagram of a variation of the form of the invention shown in FIG. 5.

In FIGS. 5 and 6, there is shown several variations of an alternate form of the invention in which an ultracapacitor of the type developed and sold by Pinnacle Research Institute, Inc., of Los Gatos, Calif., is employed to offer continuous cathodic protection regardless of adverse operating conditions.

In the field of electrical power generation, until recently, no device existed that could provide strong bursts of energy (high specific power) for sustained periods of time (high specific energy). Conventional capacitors are energy storage devices that generally provide bursts of power for short periods of time. In contrast, conventional batteries release energy through a chemical reaction at a relatively low rate or power. Batteries, therefore, generally provide moderate amounts of energy over a long period of time, but cannot provide short bursts of power.

By contrast, the ultracapacitor is designed to provide both high energy and high power. It can release large bursts of power or can provide high continuous power over a short time. The ultracapacitor does not have a conventional dielectric. Its electrode plates have surface coating made of metallically conductive ceramic. The device uses an electochemical double layer (sometimes called the Helmholtz layer) electrolyte where energy is stored by ionic separation. Dipoles of positive and negative ions are oriented along the surfaces of oppositely charged electrodes. As energy is released, this orientation relaxes back to a disorganized state of the bulk electrolyte. Unlike batteries, there is no chemical reaction; therefore, the device can be discharged and recharged an indefinite number of times. In addition the plate has a sponge-like surface giving it an actual surface area 100,000 times greater than that of a smooth plate, thus permitting much more energy to be stored. In addition, recharging is virtually limitless and almost instantaneous. The ultracapacitor has 100 times more power per ounce than conventional capacitors and electricity is stored virtually indefinitely. Other characteristics include small size, environmental safety; low cost (as expected manufacturing increases) and high reliability. Most importantly, newer second generation ultracapacitors are capable of releasing significant amounts of energy gradually over a relatively long period of time. Thus the ultracapacitor occupies a performance niche between conventional capacitors and batteries. Incorporating the ultracapacitor into the PV solar power cathodic protection system provides a system capable of operating under longer periods of adverse operating conditions. In addition to docks and the like, cathodic protection is provided for pipelines and the like transporting combustible materials in corrosive underground or underwater environments. The prepolarization step and hence the temporary power source is unnecessary in some cases.

In FIG. 5, there is shown a system 70 when the PV array is not supplying current, for example, at night. The ultracapacitor (capacitor bank 72), when required, slowly discharges providing the impressed current and maintains the beneficial negative potentials. A current blocking diode 74 is used to prevent current from going upstream and being dissipated through the resistor 62. When the PV system is not supplying current, only the portion of the circuit to the right of the line 75 (viewed along 5—5) is active.

In FIG. 6, a configuration 80 is shown without battery backup and without a variable resistor. The capacitor bank 72 is moved to the PV side so that it will be charged at a higher voltage level. An adjustable DC/DC converter 79 is used to supply approximately 3 v DC to the load 66 to be cathodically protected. A pair of diodes 76 and 78 complete the circuit. Blocking diode 76 prevents current flow to the capacitor bank 72. Blocking diode 78 prevents current flow from the load 66 to the capacitor bank 72, thus speeding up polarity decay after the capacitor bank 72 has fully discharged. In both FIGS. 5 and 6, current limiter 81 limits the supply of current from the capacitor bank 72 to that required to provide a negative potential sufficient to provide cathodic protection. The PV cathodic protection system, including the ultracapacitor, uses only renewable energy and is environmentally clean.

To my knowledge, no batteryless PV solar powered cathodic process has been previously used or tried in association with water submerged structures because of the heretofore believed need for separate backup continuous power means to maintain the system. Such backup systems, if using conventionally available shore power, require the use of rectifiers and other complex circuitry, with more frequent monitoring thereof, all of which is not cost effective and may adversely impact the environment. This PV solar powered CP system would be ideal for remote locations.

From the foregoing, it is apparent that both a unique method and apparatus have been developed which fully achieves the objects and advantages of this invention. While a specific method and system have been described, it is apparent that other variations and modifications may be made without departing from the spirit and scope of the appended claims.

What is claimed is:

1. Apparatus for providing continuous cathodic protection for iron bearing structures when installed in an electrolytic media comprising:

a photovoltaic solar panel means located adjacent a first end of the structure and having positive and negative terminals;

means establishing linear electrical continuity between all major successive metal components of the structure to be protected, and terminal means located at the first end of the structure for receiving a conductor line from the photovoltaic solar panel to provide a negative potential adequate to provide cathodic protection;

a plurality of anodes located in predetermined offset spaced relation and generally along side the structure, the anodes being electrically connected to the structure;

a control circuit including an ultracapacitor operating in circuit with a current limiter and at least one blocking diode and electrically connected to the structure, the anodes and the photovoltaic solar panel means to thereby maintain a negative potential in the range of from about −1.050 v to about −1.600 v sufficient to provide cathodic protection to the structure when the photovoltaic solar panel means is not providing current to the structure sufficient to maintain a negative potential adequate to provide cathodic protection.

* * * * *